(12) United States Patent
Sanghvi et al.

(10) Patent No.: US 7,801,712 B2
(45) Date of Patent: Sep. 21, 2010

(54) DECLARATION AND CONSUMPTION OF A CAUSALITY MODEL FOR PROBABLE CAUSE ANALYSIS

(75) Inventors: Ashvinkumar J. Sanghvi, Sammamish, WA (US); Stephen O. Wilson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 858 days.

(21) Appl. No.: 11/424,419

(22) Filed: Jun. 15, 2006

(65) Prior Publication Data

US 2007/0294051 A1 Dec. 20, 2007

(51) Int. Cl.
*G06F 9/455* (2006.01)

(52) U.S. Cl. .................... 703/6; 714/25; 714/48

(58) Field of Classification Search .......... 703/2, 703/6, 22; 706/46, 50; 702/183, 45; 707/104.1, 707/10; 370/252; 705/10; 717/127; 714/38, 714/48
See application file for complete search history.

(56) References Cited

U.S. PATENT DOCUMENTS

| | | | | |
|---|---|---|---|---|
| 6,067,641 | A * | 5/2000 | McInerney et al. ............ | 714/38 |
| 6,249,755 | B1 * | 6/2001 | Yemini et al. ................ | 702/183 |
| 6,853,952 | B2 | 2/2005 | Chadwick | |
| 7,490,031 | B1 * | 2/2009 | Qiu .............................. | 703/22 |
| 7,490,073 | B1 * | 2/2009 | Qureshi et al. ................ | 706/50 |
| 2002/0059093 | A1 * | 5/2002 | Barton et al. .................. | 705/10 |
| 2002/0174415 | A1 * | 11/2002 | Hines .......................... | 717/127 |
| 2005/0049988 | A1 * | 3/2005 | Dahlquist et al. ............. | 706/46 |
| 2005/0096854 | A1 * | 5/2005 | Larsson et al. ................ | 702/45 |
| 2006/0085689 | A1 | 4/2006 | Bjorsne | |
| 2006/0248118 | A1 * | 11/2006 | Curtis et al. ............. | 707/104.1 |
| 2006/0268735 | A1 * | 11/2006 | McAllister et al. .......... | 370/252 |
| 2007/0050686 | A1 * | 3/2007 | Keeton et al. ................. | 714/48 |
| 2007/0288467 | A1 * | 12/2007 | Strassner et al. .............. | 707/10 |

FOREIGN PATENT DOCUMENTS

JP 2002297387 A 10/2002

OTHER PUBLICATIONS

PCT Search report For Patent Application No. 2007011199, Mailed on Jan. 4, 2008, pp. 10.

* cited by examiner

*Primary Examiner*—Paul L Rodriguez
*Assistant Examiner*—Kandasamy Thangavelu
(74) *Attorney, Agent, or Firm*—Lee & Hayes, PLLC

(57) ABSTRACT

Various embodiments provide a causality model is used to express causality of system entities in terms that do not necessarily require knowledge of the overall composition of the specific system of which it comprises a part. The causality model, used in connection with model-based management techniques, can allow for the expression of causality in terms of relationships that particular system entities have with other system entities. These other system entities can be entities that share a direct relation or, more generally, an indirect relation with the entity for which the causality is expressed.

13 Claims, 4 Drawing Sheets

DECLARATION AND CONSUMPTION OF A CAUSALITY MODEL FOR PROBABLE CAUSE ANALYSIS

BACKGROUND

Systems in today's networked world are highly distributed and interdependent. This means that a single root failure (such as a particular component on a computing device) can result in many real and perceived failures across a network. Complicating this even more is the notion that at any given time, there can be many real problems active in a system, as well as many unknown component states stemming from visibility issues.

SUMMARY

Various embodiments are employed in the context of model-based management systems. In at least some embodiments, a causality model is used to express causality of system entities in terms that do not necessarily require knowledge of the overall composition of the specific system of which it comprises a part. The causality model can allow for the expression of causality in terms of relationships that particular system entities have with other system entities. These other system entities can be entities that share a direct relation or, more generally, an indirect relation with the entity for which the causality is expressed.

Further, in at least some embodiments, the causality expression is decoupled, in a sense, from the root cause analysis algorithms that can be used to analyze causality data. As such, those individuals who are knowledgeable and build such causality expressions for particular systems need not necessarily be aware of the analysis algorithms that are to be used to conduct causality analysis. Logically then, this can allow various different types of root cause analysis algorithms to consume the data developed by the causality model.

DETAILED DESCRIPTION

Overview

Various embodiments are employed in the context of model-based management systems. In at least some embodiments, a causality model is used to express causality of system entities in terms that do not necessarily require knowledge of the overall composition of the specific system of which it comprises a part. The causality model can allow for the expression of causality in terms of relationships that particular system entities have with other system entities. These other system entities can be entities that share a direct relation or, more generally, an indirect relation with the entity for which the causality is expressed.

Further, in at least some embodiments, the causality expression is decoupled, in a sense, from the root cause analysis algorithms that can be used to analyze causality data. As such, those individuals who are knowledgeable and build such causality expressions for particular systems need not necessarily be aware of the analysis algorithms that are to be used to conduct causality analysis. Logically then, this can allow various different types of root cause analysis algorithms to consume the data developed by the causality model.

In the discussion that follows, a section entitled "Model-Based Management" is provided and describes aspects of one type of model-based management with which the inventive embodiments can be employed. Following this, a section entitled "Causality Model-Implementation Example" is provided and describes aspects of causality model in accordance with one embodiment.

Model-Based Management

Figure 1:
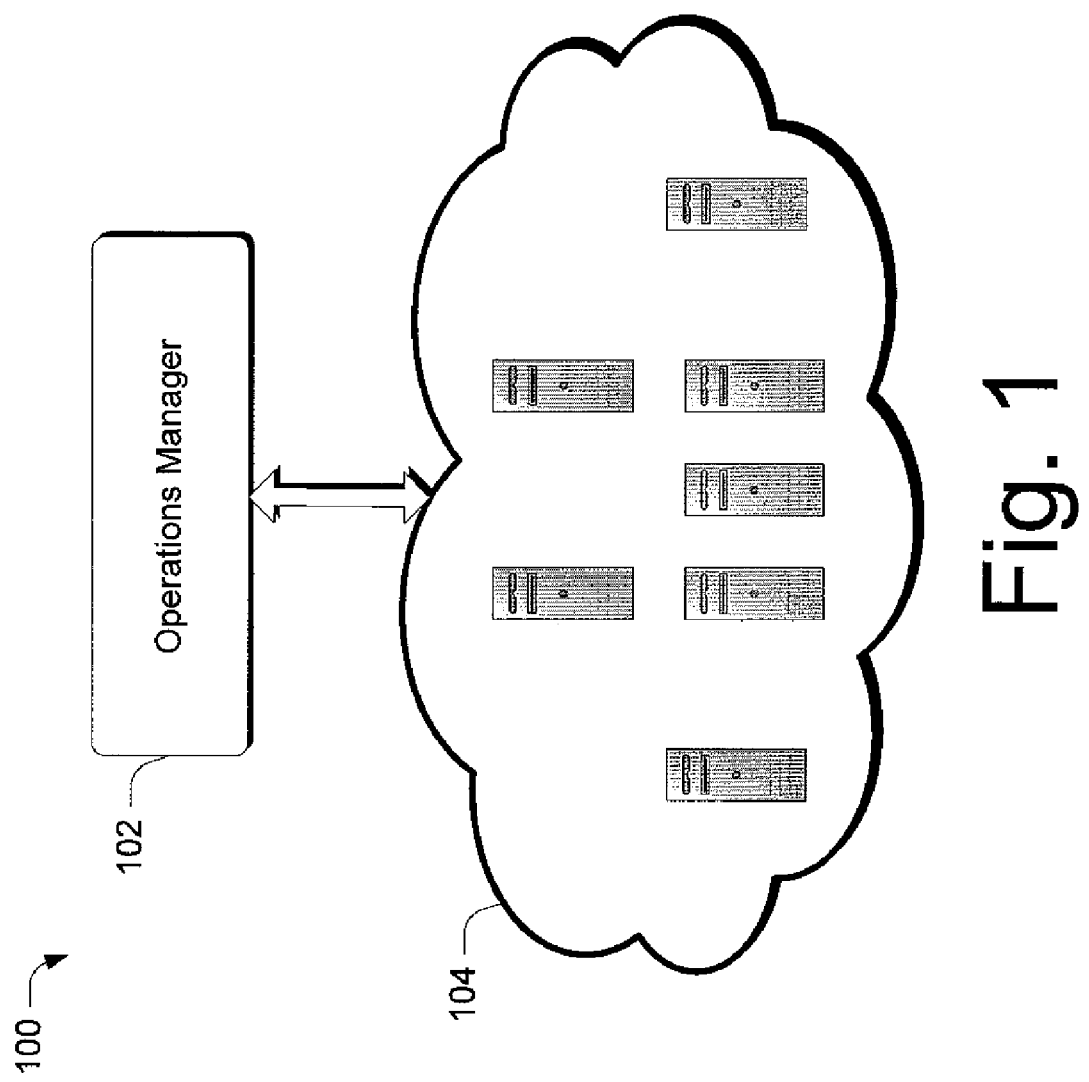
FIG. 1 illustrates an exemplary system in which the inventive embodiments can be used, in accordance with one embodiment.

FIG. 1 illustrates an exemplary system, generally at 100, in which the inventive embodiments can be used. In this example, system 100 includes an operations manager 102 and a managed environment 104. Typically, operations manager 102 can be a component that is embodied as software and configured to oversee and manage a number of different machines or computing devices that make up environment 104.

Environment 104 can include any suitable type of environment in which one or more computing devices reside. For example, such environment can include networked environments such as intranets that can be highly distributed and interdependent.

In the illustrated and described embodiments operations manager 102 employs a model-based management system to manage and oversee environment 104. Any suitable type of model-based management system can be used, with one specific, non-limiting example being given below. As will become apparent below, the inventive model-based management system makes use of a causality model that is designed to enable one to express causality across the managed environment. The approach that is used for causality expression is robust and flexible and can enable knowledgeable technicians to express causality across a system without necessarily requiring them to be aware of the specific instantiation of the system.

Figure 2:
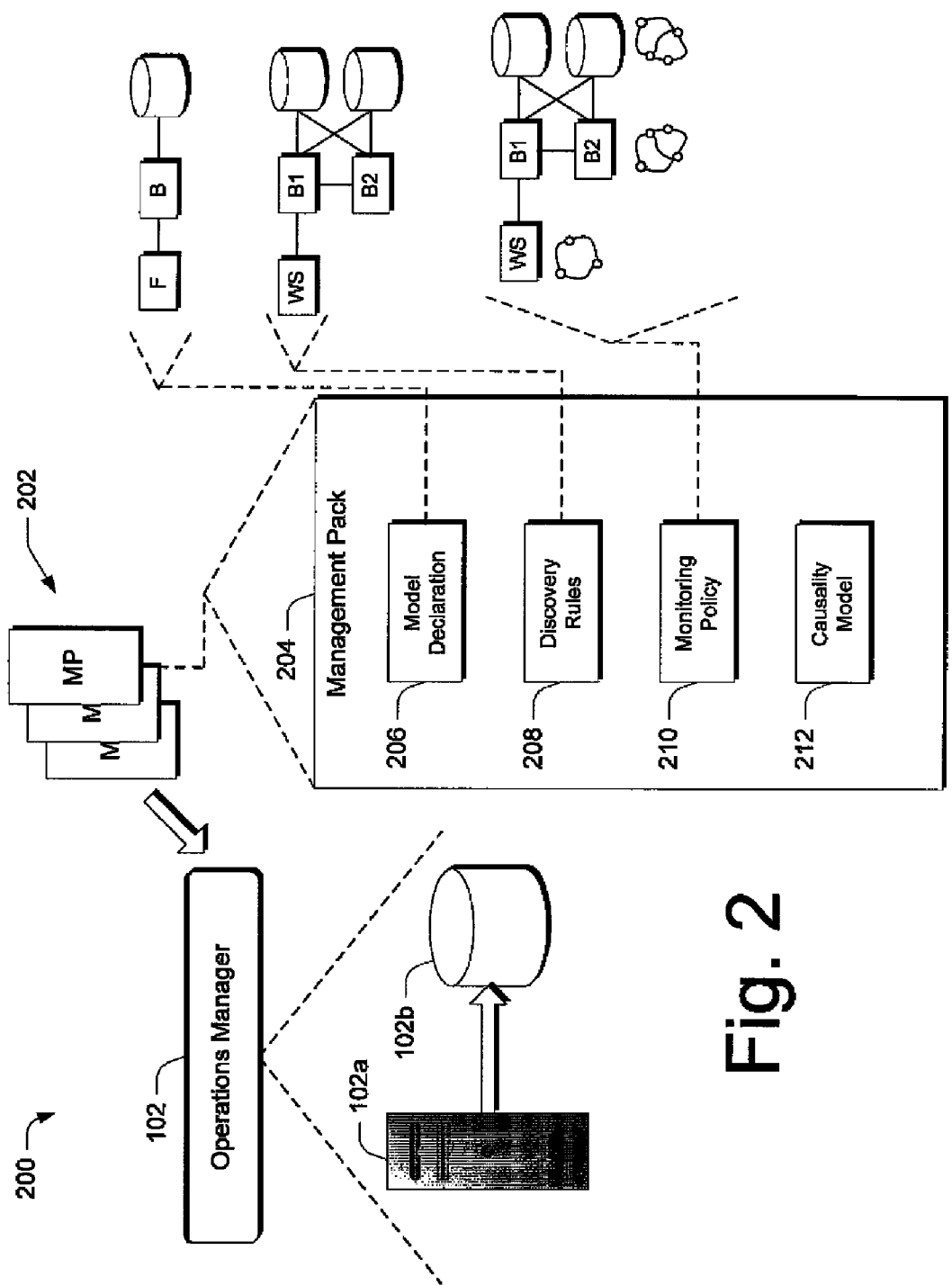
FIG. 2 illustrates a system that includes a specific instance of an operations manager in accordance with one embodiment.

FIG. 2 illustrates a system, generally at 200, that includes a specific instance of an operations manager 102. Here, the operations manager is shown to include or otherwise make use of a computing device 102a and a store 102b. In this particular example, operations manager 102 can receive or import one or more management packs 202 that individually include components that are used for its model-based management activities. In this particular example, individual management packs can be designed for any type of system such as, by way of example and not limitation, a database, a server, a client and/or sub-components of these systems, a distributed directory configuration, distributed file replication services, back up services and various higher level services such as network access protection services and the like. Needless to say, the number and types of systems for which management packs can be designed are simply too numerous to list, as will be appreciated by the skilled artisan. In practice, management packs can be designed by different third parties who may not necessarily be aware of the specifics instantiations of a management pack designed by another third party.

In the illustrated example, an individual management pack 204 is illustrated and includes a model declaration module 206, a discovery rules module 208, a monitoring policy module 210 and a causality model module 212, each of which is described below.

Model declaration module 206 represents an abstraction or an abstract model that describes the components of a management pack, along with their properties and how they are related. In the discussion that follows, the individual components of a management pack described by the model declaration can be thought of as "objects" and individual instances of these objects are referred to as "entities". For example, the management pack might describe a front end "F" object, one or more business logic layer(s) "B" objects and a store object.

Discovery rules module 208 includes instructions on how to "tangibilize" the declared model and create a concrete model having individual entities. Specifically, the discovery rules module describes how to find the entities in a particular physical environment, and the relationship that these entities have with other entities. In this specific example, the front end "F" from the abstract model may consist of a web site "WS" on a particular described machine that communicates with a first business logic layer B1. Another business logic layer B2 may communicate with the first business logic layer, and each business logic layer may communicate with each of two different stores as shown.

The monitoring policy module 210 provides what is known as a "health model" and knowledge rules that provide, in essence, a state machine that describes the states and transitions between the various states for the individual constituent entities of the concrete model that was created from the model declaration. Notice in the example, that the web site and business logic entities each include a state machine that represents the various states that each entity can assume and the events that cause transitions between the various states, as will be appreciated by the skilled artisan. Using the monitoring policy module, the associated health model and its knowledge rules, the state of the constituent entities of the concrete model can be computed at any time and appropriate notifications can be generated if, for example, an entity enters an undesirable or fault state.

The causality model module 212 or simply "causality model" leverages the monitoring policy and discovery rules (and its expression of the relationship between entities) to express causality across the particular system of the management pack. The expression of causality can include not only entities that are part of the instant management pack, but entities that are part of a different management pack. By expressing causality in this manner, root cause analysis engines or correlation engines can be designed to access and utilize data generated by the causality model to facilitate the discovery of the root cause of a particular fault—even when the fault at issue is caused by an entity in a different management pack.

In the FIG. 2 example, if business logic layer B1 has a critical state that can be caused by a grooming state in one of the stores, then rules or causality expressions can be designed to express the notion that if business logic layer B1 enters that state, one reason might be the grooming state of the particular store. Accordingly, those individuals who are knowledgeable of their particular management packs and its objects can formulate a causality model that describes not only potential causes that emanate from their management pack, but potential causes that emanate from other management packs.

In the discussion that follows, one specific example of a causality model is described. It is to be appreciated and understood that the description below is not intended to limit application of the claimed subject matter to only the specific approach that is described. Rather, other approaches can be used without departing from the spirit and scope of the claimed subject matter.

Causality Model—Implementation Example

Before describing a specific causality model, consider the following challenges that one faces when designing a causality model.

First, particular causes can be far removed from the symptoms that are observed. For example, it is generally known by the skilled artisan that the root cause of a particular problem might be on another system or even in another problem domain, e.g. a network or storage domain. However, in a well-modeled system, the managed entities where the cause and the effect reside are related in some fashion. Thus, as will become apparent below, the inventive causality model utilizes these relationships to express causality.

Second, causality knowledge tends to be defined in some systems in the absence of a concrete model. That is, in many systems cause and effect are effectively hard-coded into the system. This leads to an undesirable degree of inflexibility. The inventive approach circumvents this problem by expressing the causality in terms of class models, and computing causality by reasoning over a discovered concrete model, as will become apparent below.

Further, there can typically be multiple simultaneous causes for an observable fault. That is, it is possible that at the same time more than one condition is causing a particular problem. The inventive approach addresses this situation by ensuring that the causality analysis can return one or more results based on one or more possible reasons.

In addition, causes can belong to one or more members of a dynamic group. As an example, consider the following. In many situations where load balancing, failover, redundancy and composition are employed, the causality logic will typically have to deal with one or more members of a group that can change dynamically. The inventive approach addresses this situation by having the group modeled and the contribution of each of the entities represented by a rollup algorithm that allows aggregation logic, e.g. "any", "all", "at least" and the like. So, for instance, a set of network IP hops on a single route from point A to point B would be modeled as members of a group called "route". And all "routes" from point A to point B would be modeled as members of the "NetworkAccess" group.

Since we essentially have an N-Square problem, we can utilize a "provider" mechanism to dynamically surface a required instance of this group from the discovered model. For instance, in the example above, in a network with 100 nodes, there are 10,000 possible NetworkAccess groups, each consisting of three or four alternate routes, which are then made up of four to five hops each. In the inventive approach, we do not need to pre-compute all of those and represent them as stored instances.

Further, another challenge can be posed by unknown states. Specifically, it can be expected that any given time, one will not have access to the current health of some entities, e.g. heartbeats from an agent are dead, or synthetic transactions are timing out. The expression of causality should be able to provide reasonable results in spite of partial data.

Given the above challenges, the following concepts are utilized to help build a structure for defining causality knowledge.

A Managed Entity is an entity that is described in a model within a management pack and can reside as a software, hardware or firmware component.

An Impacted Managed Entity (IME) is a managed entity in a non-healthy state being studied, e.g. a website or database.

An Impacted State is a certain state definition in the health model for an IME for which the causality logic is being expressed, e.g. "Slow Response for First Byte".

A Reason pertains to the cause of an impacted state. It is possible to have one or more type of reason causing an impacted state and each reason can be expressed independently.

A Primitive Assertion is of a type: ME.State=Constant. The result is true/false or unknown. For example a primitive assertion could be:

PrinterX.OnlineState=Offline

Or

ClusterY.RollupHealthState=Red

An Abstract Primitive Assertion (APA): An abstract primitive assertion is expressed in terms of the class-model, and not a concrete instance, it is always expressed using the IME as a parameter. It is of the type:

XPath expression (IME). State=Constant

An example is as follows: IME: Websiteclass.Computer.CPU.Load=busy

A Reason Set for a given state of an IME, is a set of named APAs. As an example, consider the following:

```
<ReasonSet>
<Reason>IPConnectivity<Reason/>
    <Expression>APA1 <Expression/> ( In a more complex
model, this could be a Boolean expression).
    </ReasonSet>
```

Any instance of any Reason could be the cause of the state of the IME to be as it is.

A Causality Result Set: In a running system, when an IME is in a certain state, the analysis based on Causality will return a result set of the following type:

Reason=ReasonType; RCA ME=ME Instance; State=StateValue; Confirmed/Guessed; Rollup/Leaf The result set can have rows that can recursively contain rows of the same type based on drill down from rolled up states. The members could be based on suspected elements returned by an XQuery.

The same format is also used if the RCA ME St-ate itself could be caused by the fact that another downstream ME is in a certain state.

Implementation Example

In the following example, a system having entities that include a database, database file group, database files and logical disks for a database that spans two data files on two separate disks is utilized. First, the system is described followed by a description of the expression of the system's classes, relationships and monitors. Following this, an example is provided of how the causalities of a particular monitored state on the database can be expressed in a management pack.

Figure 3:
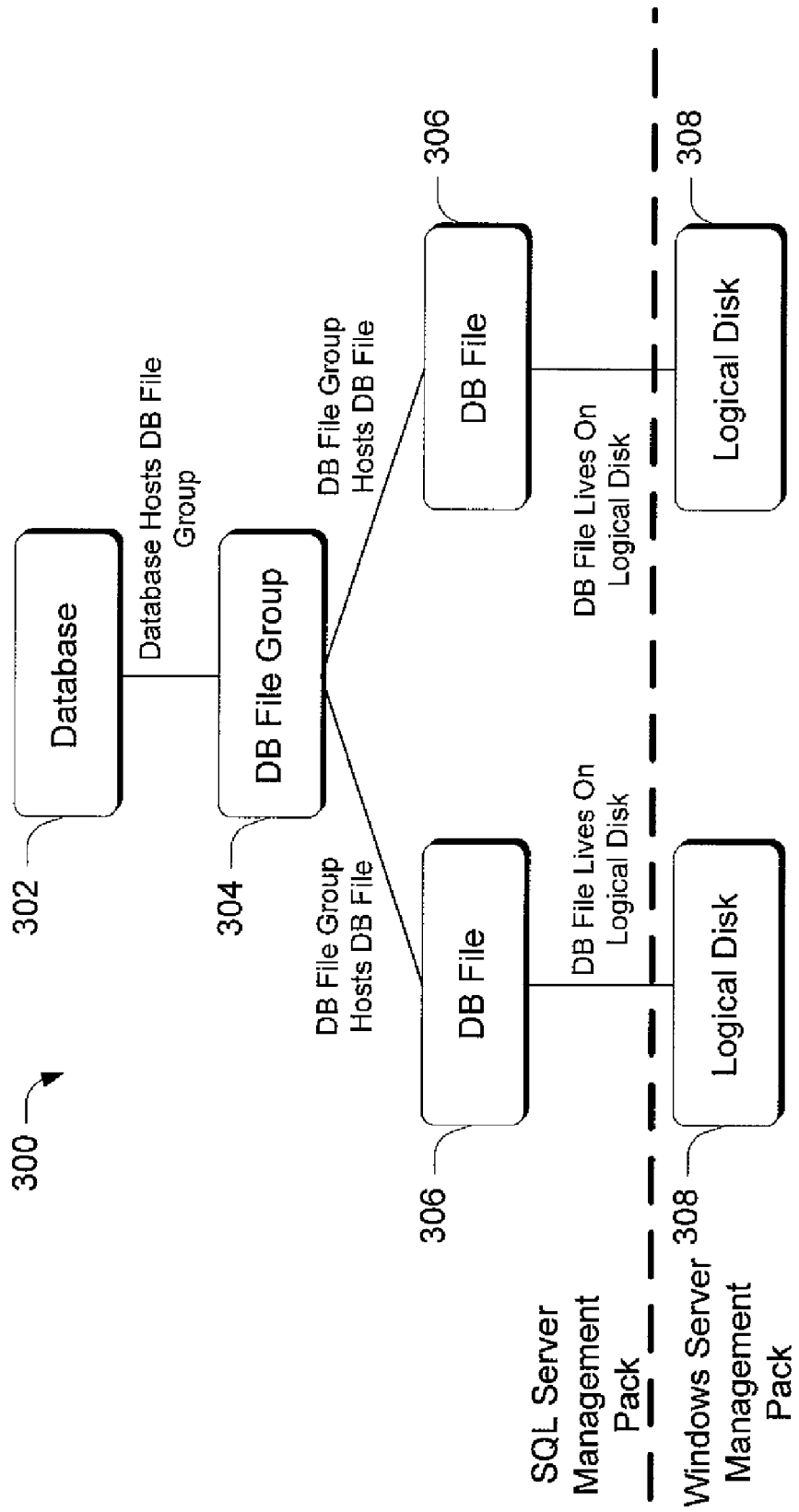
FIG. 3 illustrates an exemplary system in accordance with one embodiment.

FIG. 3 illustrates an exemplary system 300 composed of the following entities: a database 302, a database file group (DB File Group) 304, two database files (DB File) 306 and two logical disks 308. In this example, assume that database 302 is a SQL Server Database and that database 302, DBfile Group 304 and DB Files 306 are instances of classes in a SQL Server Management Pack and are discovered and monitored according to the rules in that management pack, and that logical disks 308 are instances of classes in a different management pack—Windows Server Management Pack, and are discovered and monitored according to the rules in that management pack.

In the illustrated and described embodiment, a management pack is strongly typed and includes a class ID and a relationship ID which is unique. The relationships that are expressed are also strongly typed.

In the above example, the SQL Server Management Pack and the Windows Server Management Pack declare their respective classes, relationships and monitors. The SQL Server Management Pack is responsible for monitoring the health of the classes that it declares, and the Windows Server Management Pack is responsible for monitoring the health of the classes that it declares. The health of a particular class may, however, depend on the health of an entity from another management pack, as will become apparent below. The declarations for the Management Packs (MP) in the above example are as follows:

```
Classes:
Defined in the Microsoft.SQLServer.2005.MP:
    Microsoft.SQLServer.2005.Database
    Microsoft.SQLServer.2005.DBFileGroup
    Microsoft.SQLServer.2005.DBFile
Defined in the Microsoft.Windows.Server.MP
    Windows.Server.LogicalDisk
Relationships:
Defined in the Microsoft.SQLServer.2005.MP:
    Microsoft.SQLServer.2005.DatabaseHostsDBFileGroup
    Microsoft.SQLServer.2005.DBFileGroupHostsDBFile
    Microsoft.SQLServer.2005.DBFileLivesOnLogicalDisk
Monitors:
Defined in the Microsoft.SQLServer.2005.MP:
    Microsoft.SQLServer.2005.Database.Database.DBResponse
    on the database class
    Microsoft.SQLServer.2005.Database.BackupState on the database
    class
    Microsoft.SQLServer.2005.Database.DBPercentFreeSpace
    on the database class
    Microsoft.SQLServer.2005.DBFileGroup.WriteHealth on the file
    group class
Defined in the Microsoft.Windows.Server.MP
    Microsoft.Windows.Server.LogicalDisk.DiskQueueLength
    on the logical disk class.
```

Here, under the class declarations, there are four class declarations. The first three class declarations pertain to classes within the SQL Server Management Pack—i.e., Database, DBFileGroup, and DBFile. The last class declaration pertains to an entity from another management pack—the Windows Server Management Pack and its LogicalDisk class.

The relationship declarations describe how the entities are related to one another. For example, Database has a hosting relationship with DBFileGroup (i.e. "DatabaseHostsDBFileGroup"). Likewise, DBFileGroup has a hosting relationship with DBFile (i.e. "DBFileGroupHostsDBFile"). Similarly, DBFile has a "lives on" relationship with LogicalDisk (i.e. "DBFileLivesOnLogicalDisk").

The declared Monitors are state machines that monitor a particular state of their associated entities. In the example, there are five monitors, four of which are declared in the SQL Server Management pack and one of which is declared in the Windows Server Management Pack.

With regard to the SQL Server monitors,—three are declared for the Database class—e.g., database response (DBResponse), backup state (BackUpState), and the percentage of free space (DBPercentFreeSpace). One monitor is declared for the file group class (DBFileGroupClass)—e.g., write health (WriteHealth).

With regard to the Windows Server monitors, one monitor is declared for the logical disk class (LogicalDisk)—e.g., disk queue length (DiskQueueLength).

Independent of each other, each monitor monitors aspects which affect their particular class. The monitored states are maintained and the operations manager (FIG. 1), through the causality model, can ascertain reasons why there may be a particular problem.

Consider now that the monitor Microsoft.SQLServer.2005.Database.Database.DBResponse has an operational state called "DBResponseSlow" which is associated with a slow response on the part of the database. The root cause of this state could be a number of other monitors in the system. For example, the cause of this operational state could be one or more of the following:

- The Microsoft.SQLServer.2005.Database.BackupState monitor in a BackupInProgress state;
- The Microsoft.SQLServer.2005.Database.DBPercentFreeSpace monitor in a CriticalSpace or WarningSpace state;
- The Microsoft.SQLServer.2005.DBFileGroup.WriteHealth monitor in a DiskWriteDegraded state; and/or
- The Microsoft.Windows.Server.LogicalDisk.DiskQueueLength monitor in a DiskWriteDelayed state.

These four causalities can be expressed in a schema, an example of which is shown just below.

```
<Causalities>
    <Causality
ID="Microsoft.SQLServer.2005.Database.DBResponse.Cause"
Target="Microsoft.SQLServer.2005.Database"
MonitorID="Microsoft.SQLServer.2005.Database.DBResponse">
        <OperationalStates>
            <OperationalState OperationalStateID="DBResponseSlow"/>
        </OperationalStates>
        <Reason ID="BackupRunning"
Target="Microsoft.SQLServer.2005.Database"
MonitorID="Microsoft.SQLServer.2005.Database.BackupState">
            <OperationalStates>
               <OperationalState OperationalStateID="BackupInProgress"/>
            </OperationalStates>
        </Reason>
        <Reason ID="DBLowOnSpace"
Target="Microsoft.SQLServer.2005.Database"
MonitorID="Microsoft.SQLServer.2005.Database.DBPercentFreeSpace">
            <OperationalStates>
               <OperationalState OperationalStateID="CriticalSpace"/>
               <OperationalState OperationalStateID="WarningSpace"/>
            </OperationalStates>
        </Reason>
        <Reason ID="DiskWritePeformance"
Target="Microsoft.SQLServer.2005.DBFileGroup"
MonitorID="Microsoft.SQLServer.2005.DBFileGroup.WriteHealth">
            <OperationalStates>
               <OperationalState
OperationalStateID="DiskWriteDegraded"/>
            </OperationalStates>
            <Path
RelationshipTypeID="Microsoft.SQLServer.2005.DatabaseHostsDBFileGroup"
TargetTypeID="Microsoft.SQLServer.2005.DBFileGroup"/>
        </Reason>
        <Reason ID="DiskQueueHigh"
Target="Windows!Microsoft.Windows.Server.LogicalDisk"
MonitorID="Windows!Microsoft.Windows.Server.LogicalDisk.DiskQueueLength">
            <OperationalStates>
               <OperationalState OperationalStateID="DiskWriteDelayed"/>
            </OperationalStates>
            <Path
RelationshipTypeID="Microsoft.SQLServer.2005.DatabaseHostsDBFileGroup"
TargetTypeID="Microsoft.SQLServer.2005.DBFileGroup">
                <Path
RelationshipTypeID="Microsoft.SQLServer.2005.DBFileGroupHostsDBFile"
TargetTypeID="Microsoft.SQLServer.2005.DBFile">
                    <Path
RelationshipTypeID="Microsoft.SQLServer.2005.DBFileLivesOnLogicalDisk"
TargetTypeID="Windows!Microsoft.Windows.Server.LogicalDisk"/>
                </Path>
            </Path>
        </Reason>
    </Causality>
</Causalities>
```

In this example, the causality expression is for the monitored operational state DBResponseSlow and defines four different reasons (set off by the <Reason> tags) for the operational state. The cause or reasons could be "BackupRunning", "DBLowOnSpace", "DiskWritePerformance", or "DiskQueueHigh". The first two reasons in the expression are associated with things that occur on the entity itself, i.e. the database class. The next reason refers to the DBFileGroup on which it depends—thus, the XML points across the relationship type to the DBFileGroup class. Here, a monitor on this class may be causing the problem. The last reason is associated with the LogicalDisk. Here, the XML defines multiple "hops" across relationships to arrive at possible causes.

Exploring the XML causality expression in a little more detail, consider the following. Recall that entities in a management pack utilize an ID which is unique. This is somewhat like a namespace. In the XML expression above, the <Causality> tag identifies a strongly typed class—Database, and a monitor—DBResponse. In addition, the XML identifies the state for which the causality expression is being defined—here, the operational state of DBResponseSlow on the Database class.

Thus, the <Causality> tag essentially points to the class and monitor for which the causality relationships are expressed further down in the XML expression.

Now, as can be appreciated from the above description, there can be many different reasons for a particular fault or problematic state. In the illustrated and described embodiment, each reason (within its corresponding <Reason> tag) is given an ID and a target class associated with the reason. The target class pertains to the entity on which or from which the reason emanates. Additionally, each reason also references a monitor associated with the class that could be the potential cause of a problem, as well as a state that the monitor has to be in, in order to be a possible cause of the problem or fault that is the subject of the causality expression.

Take the first listed reason as an example. Here, one possible reason for the DBResponse state of DBResponseSlow could be that there is a back up running. The back up running condition emanates from the Database class and is monitored by the BackUpState monitor. If the BackUpState monitor has an operational state of BackUpInProgress marked as "True", then this reason can be marked as a potential cause of the DBResponse state of DBResponseSlow. If the BackUpInProgress is marked as "False", then this potential cause or reason can be ruled out.

Continuing, the second-listed reason (DBLowOnSpace) points to another monitor on the same Database class, and defines states either of which could be a possible cause of a slow database response. Specifically, if the DBPercentFreeSpace monitor has either of its CriticalSpace or WarningSpace states marked as "True", then the respectively marked state could be a possible cause of the DBResponse state of DBResponseSlow.

The third-listed reason (DiskWritePerformance), is targeted to a different class (i.e. the DBFileGroup class) and a monitor associated with that class—WriteHealth. Here, if the WriteHealth monitor has its operational state of DiskWriteDegraded marked as "True", this can be listed as a potential cause of the DBResponse state of DBResponseSlow. In addition, because this reason points to a different class, it also specifies a path to that class using the <Path> tag. The <Path> tag defines the relationship type and the class at the end of the path. This declaration effectively defines a "hop" across this relationship type and specifies that any instances of DBFileGroup should be found and the specified state of its monitor should be examined.

The expression for the fourth-listed reason (DiskQueueHigh) is similar to the third-listed reason, except that there are multiple defined "hops". In this one, however, a different management pack is referenced. Specifically, in the target field a designation, e.g. "Windows!" is used to signify that the declaration pertains to a different management pack which is specified further on in the string (i.e. Windows Server). In addition, a monitor is specified as in the above examples along with the operational state or states that can affect the state at issue. In this example, the logical disk's disk queue length monitor is specified and if its operational state of "DiskWriteDelayed" is marked as "True", then this reason can be listed as a potential cause of the DBResponse state of DBResponseSlow.

In addition, because this reason pertains to a different management pack, the <Path> declaration is slightly different from the one above. Specifically, here there is a nested path relation that effectively defines a hop across all relationship types of the type specified (DatabaseHostsDBFileGroup) and finds all specified class instances (DBFileGroup), and then defines a hop across the next relationship type (DBFileGroupHostsDBFile) and finds all class instances (DBFile), and then defines a hop across the next relationship type (DBFileLivesOnLogicalDisk) and finds all instances of the specified class (LogicalDisk).

Using the above flexible causality expression, it is very easy to accomplish the following things. First, one can have the ability to declaratively describe causality in terms of an application type model and the causality model can accomplish the following things. The causality model can link two problems on the same entity as cause-effect. An example of this occurs in the first two-listed reasons above. The causality model can link two problems on directly related entities as cause-effect. An example of this is the third-listed reason. The causality model can link two problems on indirectly related entities as cause-effect. An example of this is the fourth-listed reason above.

Additionally, the causality model can link problems even if the relationship is not "containment". That is, the relationship could be "hosting", "client-server", "copy-of", or any other conceivable relationship. Further, the causality model can link many causes to the same effect. This is done in the above example where four different reasons can be the cause of the particular fault defined in the causality expression. Furthermore the causality model can link problems based on a specific type of the relationship.

Additionally, the causality model can leverage the composibility of models to compose causality models. Specifically, in the above example, each individual management pack has its own particular causality expressions that pertain to its own entities. These causality expressions, as we saw above, can reach out across and thus leverage different management packs and the causality models defined by these packs.

Further, the causality model can be separate from the root cause analysis algorithms/engines that are utilized. This can allow for different root cause analysis algorithms or engines to leverage the causality information that is developed by the causality model. One such example of a root cause analysis algorithm is provided just below.

Figure 4:
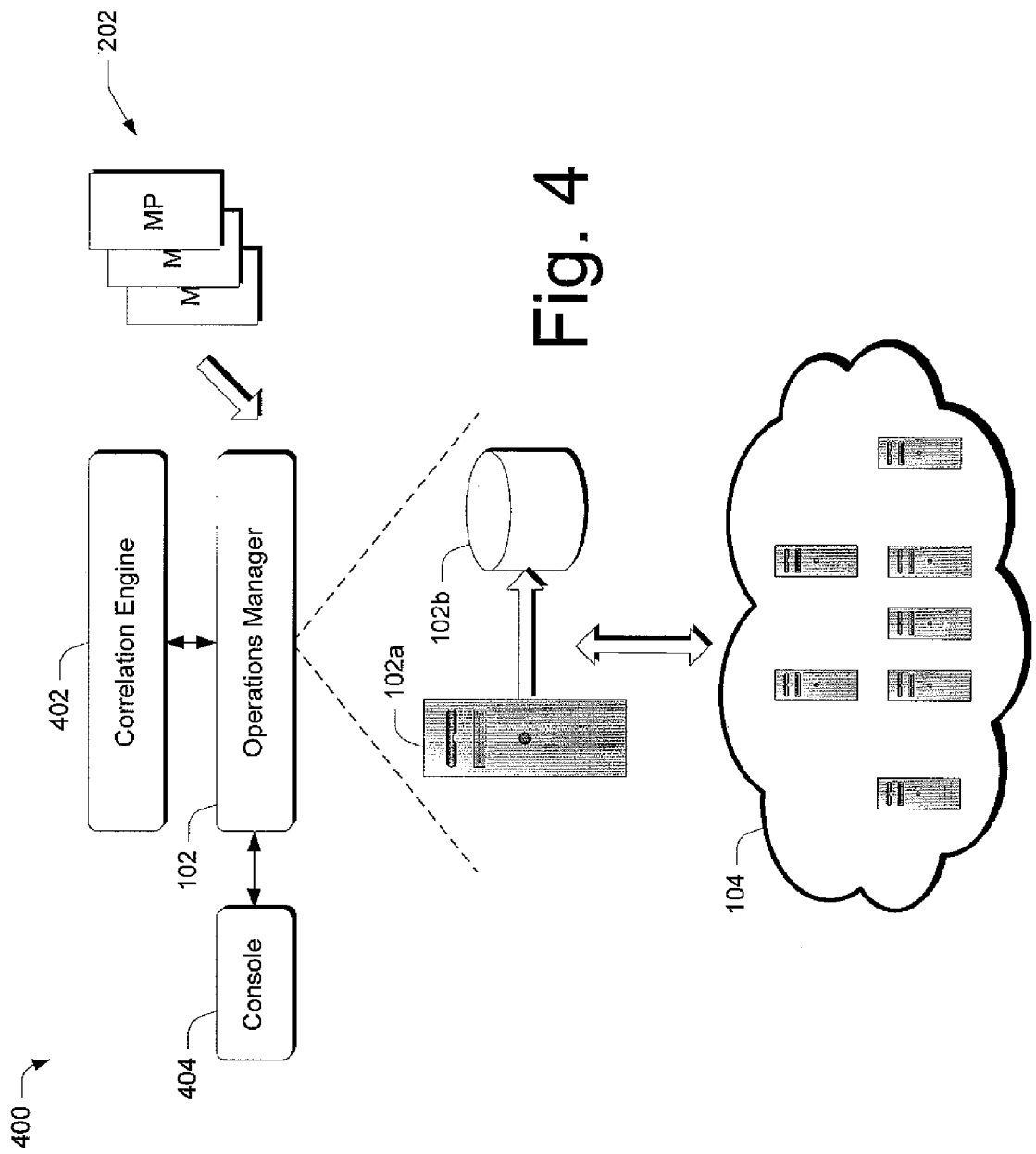
FIG. 4 illustrates an exemplary system in accordance with one embodiment.

In operation, any suitable type of system can be designed to leverage the causality model to perform root cause analysis using any suitable type of root cause analysis. As but one example of such a system, consider FIG. 4 which shows an exemplary system generally at 400.

Here, system 400 includes an operations manager 102 that manages an environment 104 as described above. The operations manager can receive and process multiple different management packs 202, each of which can include constituent parts as described above—specifically, some type of model that describes associated entities and their relationships with one another, as well as a causality model such as the one described above. In addition, a correlation engine 402 is provided and is operatively coupled with the operations manager 102. In this example, the operations manager 102 exposes an application program interface (API) that can be called by the correlation engine 402 to access data that has been developed using the causality model. In practice, the correlation engine reads concrete models and states, computes root causes and writes the root causes back to the operations manager. The operations manager can then display the root causes in the context of a topological state diagram using a console 404. Using the console, a user such as a system administrator can quickly identify the root cause or causes of a particular fault that his or her system is experiencing.

With regard to the correlation engine, any suitable algorithm can be used to analyze the data developed by the causality model. Some characteristics of such algorithms can include, by way of example and not limitation, the ability to reason over the model and the detected states, and use the set of Reason Expressions on the managed entity types to produce a Causality Result Set.

As a simple example of how a root cause analysis algorithm might process the data produced by the causality model, consider the following computation. In the description that follows, issues such as visibility and composability have been ignored.

For each state of every managed entity, a check is made to ascertain whether the state is currently "true". If the current state is not "true", then the algorithm can exit or process the next state. If the current state is "true", then next a check is made to ascertain whether the state is "good". If it is, then the algorithm can exit or process the next state.

Next, for those states that are not "good", a check is made to ascertain whether there are any reasons assigned to it. If there are no reasons assigned, then the state is marked as a root cause.

If there are reasons assigned, then the reasons are followed and a check is made to ascertain if the assertions in the reason are "true" for at least one reason. If any of the reasons are "true", then a conclusion can be made that the state being studied is just an effect of a cause elsewhere. In this case, the causality relationship can be marked accordingly (as with an arrow).

However if none of the reason assertions are "true", then that aspect of the managed entity can be marked as a root cause.

When this has been done for all managed entities, the whole topology can be displayed, with the root causes marked with a black circle and string of arrows to lead one to the root causes from bad states.

Now consider one more level of complexity. Assume that some of the entities are composed entities (such as clusters and the like). In this case, before performing the algorithm described just above, the rollup states are computed.

Now, assume that some managed entities have gone "blind", i.e. their states are unknown. In this situation one can first chase the causality in reverse. Specifically, the algorithm can find all "effect" states that are known. For that aspect of the managed entity, the algorithm can find all "reasons" that should be "true", but are unknown, to cause any of the untrue states. All those unknowns are false. That is, if they were true, the observable states would be different. In this manner, one can eliminate maximum unknowns before embarking on the algorithm described above.

However, the algorithm for computing "blame" now shifts to a statistical approach. That is, the more known states that can be explained by an unknown to be in a certain state, the higher the probability that this is true.

Notice that in the above algorithms, all inferences (determining unknown state, determining "blame" or determining probability of "blame") does not depend on the blame value of anything. It is purely based on current state values. As a result, when a state of a managed entity changes, one can ripple through that perturbation outwards based on the causality relationship. In other words, a local computation suffices, and one does not have to compute right through the fabric of all relationships.

CONCLUSION

The various embodiments described above can provide a causality model is used to express causality of system entities in terms that do not necessarily require knowledge of the overall composition of the specific system of which it comprises a part. The causality model, used in connection with model-based management techniques, can allow for the expression of causality in terms of relationships that particular system entities have with other system entities. These other system entities can be entities that share a direct relation or, more generally, an indirect relation with the entity for which the causality is expressed. At least some embodiments decouple the causality expression from the various root cause analysis algorithms that can be used to analyze causality data. As such, those individuals who are knowledgeable and build such causality expressions for particular systems need not necessarily be aware of the analysis algorithms that are to be used to conduct causality analysis. Logically then, this can allow various different types of root cause analysis algorithms to consume the data developed by the causality model.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
   one or more computer-readable media;
   a plurality of management packs embodied on the one or more computer-readable media, wherein each individual management pack comprises:
   a model declaration that represents an abstract model that describes components of the management pack, properties associated with the components, and relationships between the components, the components representing objects in a subsystem of a modeled system;
   discovery rules that describe how to find entities in a particular environment and relationships between the entities, the entities being instantiations of the objects;
   a monitoring policy that comprises a state machine that describes states and transitions associated with each entity of the entities; and
   a causality model that uses the discovery rules and the monitoring policy to express causality across the subsystem of the modeled system, wherein the causality model further:
   expresses causality in a manner that does not require specific knowledge of an instance of remaining management packs; and
   expresses multiple different reasons for an observable fault, with at least one reason being associated with a different entity in a different management pack than an entity for which causality is expressed; and a root cause analysis engine to access and utilize data generated by the causality model to determine a root cause of the observable fault based at least in part on the at least one reason expressed by the causality model.

2. The system of claim 1, wherein the causality model declares dependencies on other management packs.

3. The system of claim 1, wherein the causality model is configured to use state information developed by the state machine to perform causality processing.

4. The system of claim 1, wherein the causality model expresses causality in XML.

5. The system of claim 1, wherein the causality model expresses causality in terms of class models and wherein the causality model is used to compute causality by reasoning over a discovered concrete model.

6. The system of claim 1, wherein the at least one reason is associated with a same entity for which causality is expressed.

7. A method comprising:

implementing on a computing device by a processor configured to execute instructions that, when executed by the processor, direct the computing device to perform steps comprising:

providing a plurality of management packs wherein each management pack comprises:

a model declaration that represents an abstract model that describes components of the management pack, properties associated with the components, and relationships between the components, the components representing objects in a subsystem of a modeled system;

discovery rules that describe how to find entities in a particular environment and relationships between the entities, the entities being instantiations of the objects;

a monitoring policy that comprises a state machine that describes states and transitions associated with each entity of the entities and monitors a particular state of the entity; and a causality model associated with the model declaration and used to compute causality that:

uses the discovery rules and the monitoring policy to express causality across the subsystem of the modeled system;

expresses causality in a manner that does not require specific knowledge of an instance of remaining management packs; and expresses multiple different reasons for an observable fault, with at least one reason being associated with a different entity in a different management pack than an entity for which causality is expressed;

expressing, in the management pack, causality in terms of classes, relationships and monitors; and enabling a root cause analysis engine to access and utilize data generated by the causality model to determine a root cause of the observable fault.

8. The method of claim 7, wherein the step of expressing multiple different reasons comprises expressing a dependency on a different management pack.

9. The method of claim 7, wherein the step of expressing causality comprises expressing causality using an XML expression.

10. The method of claim 7, wherein at least some reasons is associated with an entity for which the causality is expressed.

11. The method of claim 7, wherein at least some reasons are associated with an entity that are more than one hop away in terms of modeled relationships.

12. The method of claim 7, wherein causality is type specific.

13. The method of claim 7, wherein at least some reasons are associated with a different entity from same class as the entity for which the causality is expressed.

* * * * *